United States Patent [19]

Rice

[11] 3,994,560

[45] Nov. 30, 1976

[54] REFLECTIVE ANIMAL COLLAR

[75] Inventor: Harold D. Rice, Leawood, Kans.

[73] Assignee: The Lee Company, Leawood, Kans.

[22] Filed: Aug. 19, 1974

[21] Appl. No.: 498,387

[52] U.S. Cl. .................... 350/98; 350/97; 350/99

[51] Int. Cl.[2] .................... G02B 5/12

[58] Field of Search .................... 350/97, 98, 103, 106; 119/106

[56] References Cited

UNITED STATES PATENTS

| | | | |
|---|---|---|---|
| 1,739,289 | 12/1929 | Carter | 350/98 |
| 2,199,996 | 5/1940 | Hobson et al. | 350/98 X |
| 2,656,763 | 10/1953 | Frost | 350/98 |
| 3,547,515 | 12/1970 | Shanok et al. | 350/97 |
| 3,871,336 | 3/1975 | Bergman | 350/98 X |

*Primary Examiner*—Vincent P. McGraw
*Assistant Examiner*—Ben W. delos Reyes
*Attorney, Agent, or Firm*—Lowe, Kokjer, Kircher, Wharton & Bowman

[57] ABSTRACT

A collar particularly adapted for animals and characterized by an improved reflective surface is provided. An elongated, flexible strip of clear extruded plastic has a pocket which extends through a convex arc of at least ninety degrees. A strip of light-reflective material is sealed in the pocket so as to present a convex light-reflective surface. By sealing the reflective material within the transparent pocket, it is not possible for the animal to wear away the light-reflective surface and dirt and other foreign materials cannot diminish its light-reflective ability. In one embodiment the flexible strip is sealed at both ends and a buckle is secured while complemental eyelets are provided for presenting means to secure the collar around the animal. In another embodiment, an elongated slot is provided along the length of the collar and is adapted to receive a conventional collar thereby permitting the reflective collar to be slipped on and off and worn only when needed.

8 Claims, 5 Drawing Figures

REFLECTIVE ANIMAL COLLAR

This invention relates generally to devices for making animate objects visible at night and, more particularly, to a reflective device to be worn around a portion of the body.

Whenever animals are running at night there is the ever present danger of the animal being struck by a vehicle for failure of the driver to see the animal. Also, with both pets and hunting dogs there is a problem of the animal becoming separated from its master during hours of darkness. Some of the same problems which are a danger with pets and hunting dogs are also applicable to small children and even adults if the latter are riding bicycles or the like.

Many attempts have been made to provide reflective articles of wearing apparel so as to facilitate identification of an animate object in the dark. Particularly with pets and hunting dogs, reflective collars which have heretofore been provided, have not been highly satisfactory. A major problem has been the fact that the animal invariably wears away the reflective material making the collar ineffective in the dark. In some instances location of the reflective material has been limited to the portion of the collar which is least exposed to wear but this reduces the reflective surface and accordingly the effectiveness of the collar. It has also been an inherent problem with many reflective collars of the prior art that the reflective surface is located in a plane parallel to the portion of the body around which it is worn. With pets and hunting dogs this particular location is often subject to being partially covered by the hair of the animal and even when it is uncovered, the reflective angle is not one of maximum efficiency.

It is therefore a primary object of the present invention to provide a light-reflective band adapted to be worn during darkness and having a light-reflective surface extending in a convex arc relative to the plane of the portion of the body around which it is worn thereby providing for light reflection over a much greater range of angles.

As a corollary to the above object, an aim of the invention is to provide a light-reflective band as described wherein the side of the band in contact with the wearer's body is generally flat so as to minimize undesired movement of the band and maximize wearing comfort.

It is also an objective of this invention to provide a light-reflective band which is adapted to be worn around a portion of the body and wherein the light-reflective surface extends over an arc of approximately 290° so as to provide reflective surfaces in both horizontal and vertical planes thereby providing a surface from which light may reflect regardless of the relative positions of the wearer of the band and the oncoming light rays.

Still another object of the invention is to provide a light-reflective band of the type described in the foregoing objects which may be easily attached to and removed from a conventional pet collar.

Still another object of the invention is to provide a light-refelctive band of the type described in the foregoing objects which can be constructed to form a complete self-contained animal collar or belt.

Still another important objective of the invention is to provide a light-reflective band wherein the reflective surface is completely enclosed in translucent or transparent plastic and an identification tag may also be inserted in the band on the side opposite the reflective surface.

Still other objects of the invention will be made clear or become apparent when the following description and claims are read in light of the accompanying drawing wherein:

Figure 1:
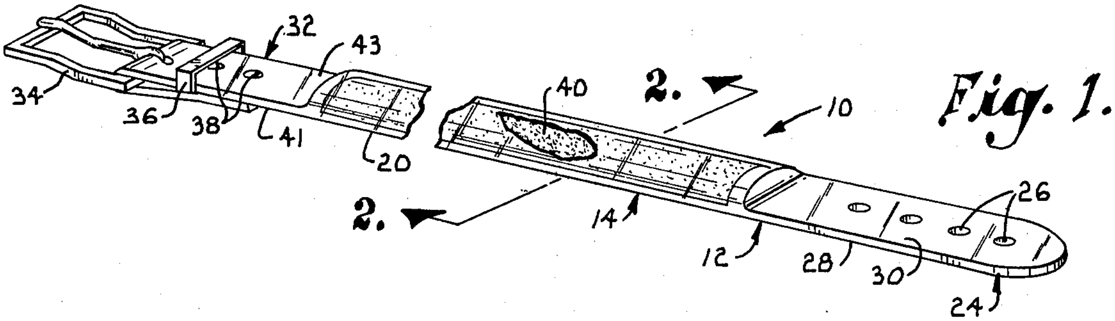
FIG. 1 is a perspective view of one form of a light-reflective band constructed according to the present invention.
Figure 2:
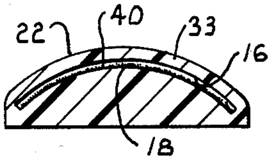
FIG. 2 is a cross-sectional view of the band shown in FIG. 1 taken along line 2—2 of the latter figure.

Referring initially to FIG. 1, the reflective band of the present invention has been designated generally by the numeral 10. Band 10 comprises an elongated flexible transparent strip designated generally by the numeral 12 and preferably extruded from a clear transparent plastic material. Strip 12 comprises a central portion 14 having a pocket 16 therein extending through an arc of approximately 90°. Pocket 16 provides a convex supporting surface 18 extending over an arc of approximately 90° for purposes to be made clear hereinafter. One side 20 of central portion 14 is substantially flat while the opposite side 22 extends in a convex arc generally corresponding to the arc of pocket 16 and surface 18. A transparent wall 23 separates pocket 10 from convex side 22.

Central portion 14 merges into and is integral with a first end portion 24 having a plurality of openings 26 centrally disposed in spaced apart relationship along its length. End portion 24 has a first side 28 which is co-planar with and merges into side 20 of portion 14. A second side 30 of portion 24 also presents a flat generally planar surface.

On the opposite side of central portion 14 is a second end portion 32 to which a buckle 34 and loop 36 are secured by rivets 38. End portion 32 also has two flat sides 41 and 43, the former of which merges into and is co-planar with side 20 of central portion 14.

Disposed on surface 18 and sealed within pocket 16 is a light-reflective material 40 which is preferably a reflective tape or other similar material having a backing so as to permit it to be inserted into pocket 16 after the latter is formed but before it is sealed. Manifestly, material 40 extends over the entire surface 18 so as to present a reflective surface over an arc of approximately 90°.

Figure 3:
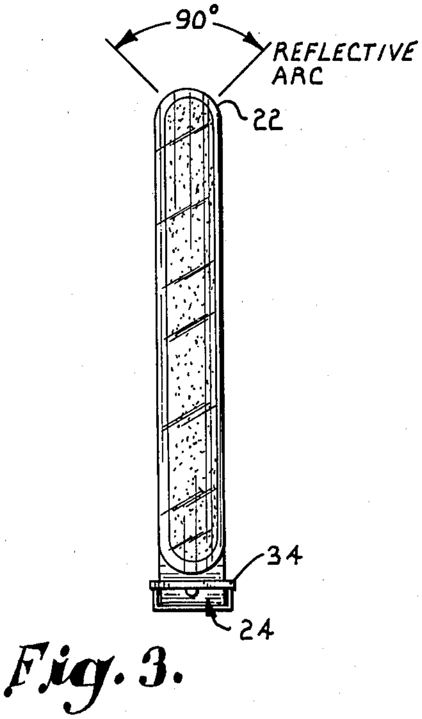
FIG. 3 is an elevational view of the reflective band taken from one side in the position the band would normally assume around the neck of a pet or hunting dog.
Figure 4:
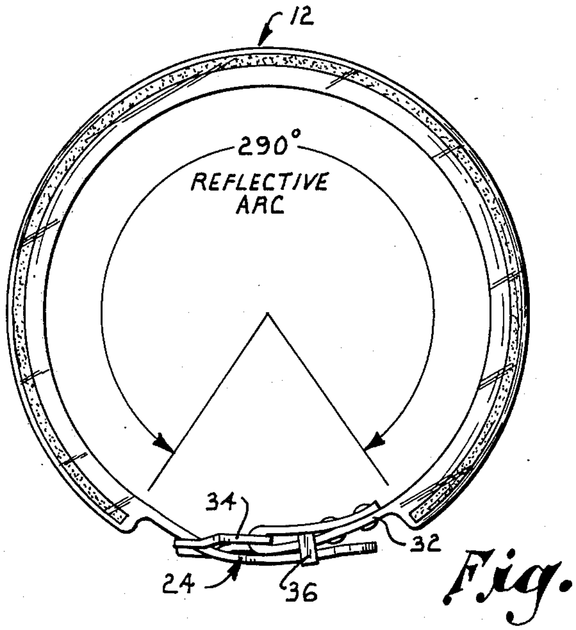
FIG. 4 is a front elevational view of the band in the position illustrated in FIG. 3 showing the extent of the reflective arc which the band presents in one plane.

When the band 10 is disposed around the neck of a pet or hunting dog, it will assume the approximate disposition illustrated in FIGS. 3 and 4. Thus, as illustrated in the drawing, a reflective arc of approximately 90° relative to a horizontal plane is provided and a reflective arc of approximately 290° relative to a vertical plane is presented. The convex reflective surface which extends outwardly away from the plane of the portion of the body around which the band is worn greatly increases the reflective area available for light to strike over what would be possible with a flat surface parallel to the plane of the body of the wearer. The 290° reflective arc assures that a reflective surface will be available for light to strike regardless of the relative positions of the wearer of the band and the light source. This wide reflective arc is possible since the entire reflective area is enclsosed within the pocket 16 and therefore even the reflective material which is in an area where it would be highly susceptible to wear if exposed is protected.

Figure 5:
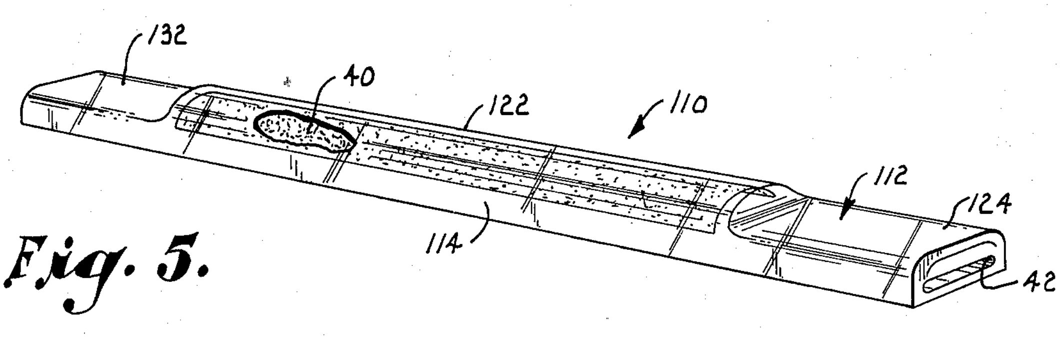
FIG. 5 is a perspective view of a modified form of the reflective band.

Referring additionally to FIG. 5, a modified form of the reflective band of the invention is designated generally by the numeral 110. Band 110 comprises an elongated flexible strip 112 having a central portion 114 and end portions 124 and 132.

Central portion 114 is provided with a pocket for receiving a reflective material 40 in a convex arc as previously described for the preferred embodiment with the reflective material being covered by a convex outer surface 122 of the central portion.

The modified band 110 differs from the reflective band 10 only in having an elongated slot 42 which extends along the length of the band in backing relationship to each of portions 114, 124 and 132.

In use, the band 110 is adapted to be slipped over an existing collar by inserting the latter into slot 42. Thus, the refelctive band may be worn or removed as is desired.

In still another modification of the invention which has not been shown in the drawings, it is contemplated that a double pocket will be provided in either of bands 10 or 110 so that one pocket may be sealed with the reflective material 40 inside and the other pocket being adapted to accommodate an identifying nameplate visible from the side of the band opposite the reflective material 40. Manifestly, the identifying name tag would be removable although it would be substantially enclosed in clear plastic so as to permit it to be read without being removed and to preclude most foreign material from obliterating the identifying information. It is contemplated that in some applications it may be desirable to incorporate a quantity of luminous material in with the reflective material 40 so that the wearer of the band will be visible even when no light is striking the band.

Having thus described the invention, I claim:

1. A light-reflective band adapted to present a collar around the neck of an animal, said band comprising:

an elongated strip having at least one outer surface of translucent material, said strip presenting a convex supporting surface underlying said one outer surface and extending through an arc of at least approximately 90°, a pocket for receiving a light reflective material between said one outer surface and said supporting surface, and a flat side opposite said convex supporting surface, said strip being characterized by a degree of flexibility along its longitudinal dimension to accommodate bending of the strip into a loop extending through an arc of at least approximately 290° with the said convex supporting surface facing outwardly of the loop;

a light-refelective material disposed in the pocket, said material extending substantially over and being supported by said support surface; and means for securing said strip around the neck of said animal.

2. The invention of claim 1, wherein the said one surface of said strip forms a convex arc generally corresponding to said convex supporting surface.

3. The invention of claim 2, wherein said pocket is sealed to preclude the entry of foreign material while preventing movement of the light-reflective material.

4. The invention of claim 3, wherein the said one surface of said flexible strip is substantially transparent.

5. The invention of claim 4, wherein said light-reflective material comprises a luminous material.

6. The invention of claim 4, wherein said flexible strip is translucent.

7. The invention of claim 1, wherein the means for securing the strip comprises complemental fastening elements disposed at opposite ends of the strip.

8. The invention of claim 1, wherein the means for securing the strip comprises a slot adapted to receive a collar.

* * * * *